United States Patent [19]
Audeval et al.

[11] Patent Number: 5,120,247
[45] Date of Patent: Jun. 9, 1992

[54] CONNECTION STRIP FOR HIGH-RELIABILITY CABLING

[75] Inventors: Fabrice Audeval, Aiglemont; Laurent Beloin, Charleville Mezieres; Maurice Lejuste, Vrigne aux Bois; Albert Lissillour, Lannion Cedex, all of France

[73] Assignees: Mars Actel, Vrigne Aux Bois; France Telecom, Paris, both of France

[21] Appl. No.: 761,076

[22] Filed: Sep. 17, 1991

[30] Foreign Application Priority Data

Sep. 17, 1990 [FR] France ............... 90 11446

[51] Int. Cl.⁵ ............................ H01R 4/24
[52] U.S. Cl. ............................ 439/403
[58] Field of Search ............... 439/389–426

[56] References Cited

U.S. PATENT DOCUMENTS

| | | | |
|---|---|---|---|
| 3,631,378 | 12/1971 | Ellis, Jr. | 439/400 |
| 3,772,635 | 11/1973 | Frey et al. | 439/403 |
| 3,798,587 | 3/1974 | Ellis, Jr. et al. | 439/403 |
| 4,486,064 | 12/1984 | Long et al. | |
| 4,652,070 | 3/1987 | Suffi | |

FOREIGN PATENT DOCUMENTS 0200883 11/1988 European Pat. Off. .

*Primary Examiner*—Joseph H. McGlynn
*Attorney, Agent, or Firm*—Sughrue, Mion, Zinn, Macpeak & Seas

[57] ABSTRACT

The connection strip is an insulating block in which connection elements are mounted to define insulation displacement connectors in rows of chimneys on a front face of the block, and rows of other connectors on the rear face of the block. The chimneys are separated from one another by transverse slots extending across their rows and they are capable of receiving single or twin pushers in such a manner as to be held captive between a pulled-out position and a pushed-in position in the chimneys. The connection strip includes end wire-passing pieces on the front face of the block, and is applicable to telecommunications.

23 Claims, 5 Drawing Sheets

CONNECTION STRIP FOR HIGH-RELIABILITY CABLING

The present invention applies to the field of telecommunications. It relates to a connection strip for telephone lines. It is used for connecting pairs of conductors in a "transport" cable to pairs of conductors in lower-capacity "distribution" cables, or for connecting a distribution cable to subscriber lines by means of jumpers between two strips in a distribution frame housing or a subdistribution frame housing.

BACKGROUND OF THE INVENTION

Such connection strips are already known per se. They have multiple connection points for the conductors of the cable(s) on one of their faces, namely the "rear" face under conditions of use, an to the same number of connection points for the pairs of conductors in different jumpers on their other, or "front" face.

The connections made on the rear face are considered to be fixed and final. Except under exceptional circumstances, no action normally needs to be taken on this rear face. In contrast, the front face is where all the action takes place for installing or replacing jumpers or the changing connections.

One such connection strip is described in the patent U.S. Pat. No. 4,652,070, in particular. That strip is in the form of a block of insulating material in which a plurality of connection elements are mounted. The connection elements define connection points in a plurality of rows both on the front face and on the rear face of the strip.

Before any action is taken on the front face, the connection elements terminate in chimneys defined in longitudinal ribs projecting from said face. Each rib corresponds to a row of connection points. The ribs are separated from one another by valleys to allow jumpers to pass between them.

The individual connection elements mounted in the insulating block are either in the form of single pieces, or else in the form of pairs of pieces which are connected together. In the front face, they have respective insulation-displacement connector forks in the various chimneys defined on the front face, and at their opposite ends in the rear face of the block they have connectors that may be of the same type or of a different type. Each insulation-displacement connector receives a corresponding insulated conductor which is directly connected thereto without prior stripping, merely by being displaced within the connector. Slots provided in opposite sides of each chimney on the line between the branches of each fork enable the conductors to move within the insulation displacement connectors.

According to that document, pushers are also associated with the connection strip for simultaneously connecting the two conductors of each jumper in two adjacent insulation-displacement connectors in the same row.

These pushers are made of insulating material. Each of them has two legs that fit the chimneys and that are connected together by a bridge at one end. Each pusher receives the two conductors of a jumper inserted through respective ones of its legs close to the bridge joining them. These two conductors are connected simultaneously to the two insulation-displacement connectors by pushing home the two legs of the pusher into two chimneys. The bridge joining the two legs is held in the hand during insertion and also serves in particular as an end stop for the pusher in the two chimneys closed thereby. In addition, it serves for removing a pusher that has been installed.

Although such a strip is satisfactory overall, it nevertheless suffers from several practical problems due essentially to the environmental conditions in which it is used and to the density of the connections that it achieves. This applies in particular in a high humidity environment since that may give rise to damaging condensation on the connections. It also applies to the actions involved when installing new jumpers or when changing existing jumper connections because of the large number of jumpers passing between each row of insulation displacement connectors.

An object of the present invention is to avoid these problems, in particular by increasing the creepage distances between the insulation displacement connectors within a small space, and also by facilitating conductor handling in the event of jumpers being replaced or changed over.

SUMMARY OF THE INVENTION

The present invention provides a connection strip for high reliability interconnection of pairs of conductors in a cable and pairs of conductors in jumpers, the strip comprising:

an insulating block having projecting rows of chimneys on a "front" one of its faces, with valleys between the rows of chimneys for passing the conductors of the jumpers;

a plurality of connection elements mounted and held in said block, terminal portions of the connection elements defining first individual connectors in respective chimneys on said front face of the block for connection with jumper conductors, and rows of second individual connectors on the opposite "rear" face of the block for connection with the cable conductors;

first protection means for protecting the conductors of each jumper installed in the first connectors in their chimneys; and second protection means for protecting the cable conductors installed in each row of second connectors;

wherein said chimneys are separated from one another by transverse first slots extending across the rows thereof, thereby creating creepage distances around the outlines of said transverse slots, and wherein said connection strip further includes two wire-passing pieces on said block at the ends of the rows of chimneys and having grooves for passing the jumper conductors. It also includes wire guides in the valleys between the rows of chimneys and for the "bottom" end row.

Advantageously, each wire-passing piece has one more groove than there are valleys or wire guides mounted in the valleys of the block, and has consecutive grooves disposed in pairs substantially end-on on either side of one a set of wire outlets on one of the wire guides, for the purpose of conveying respective ones of the conductors in each of the jumpers on the wire guide, thereby splaying out and separating the conductors of the various jumpers.

In addition, according to other characteristics:

each chimney has a "bottom" slot for retaining the conductor it receives and installed in its connector which is of the insulation-displacement type;

the chimneys are closed by single caps or by twin caps or by single pushers or by twin pushers;

the single pushers or twin pushers are held captive in their chimneys, between a pulled-out position and a pushed-in position;

on the bottom faces of their legs, the pushers have guide Vs for blind insertion of conductors, and they have opposite loop-holes for viewing the inserted conductors; and the pushers for different pairs of jumper conductors are identifiable and/or recognizable and they have test points offset from the axes of the connectors in the chimneys.

BRIEF DESCRIPTION OF THE DRAWINGS an embodiment of the invention is described by way of example with reference to the accompanying drawings, in which:

FIG. 5 is a side view of the single pusher of FIG. 4;

FIG. 6 is a view of the single pusher as seen from below; and

DETAILED DESCRIPTION

Figure 1:
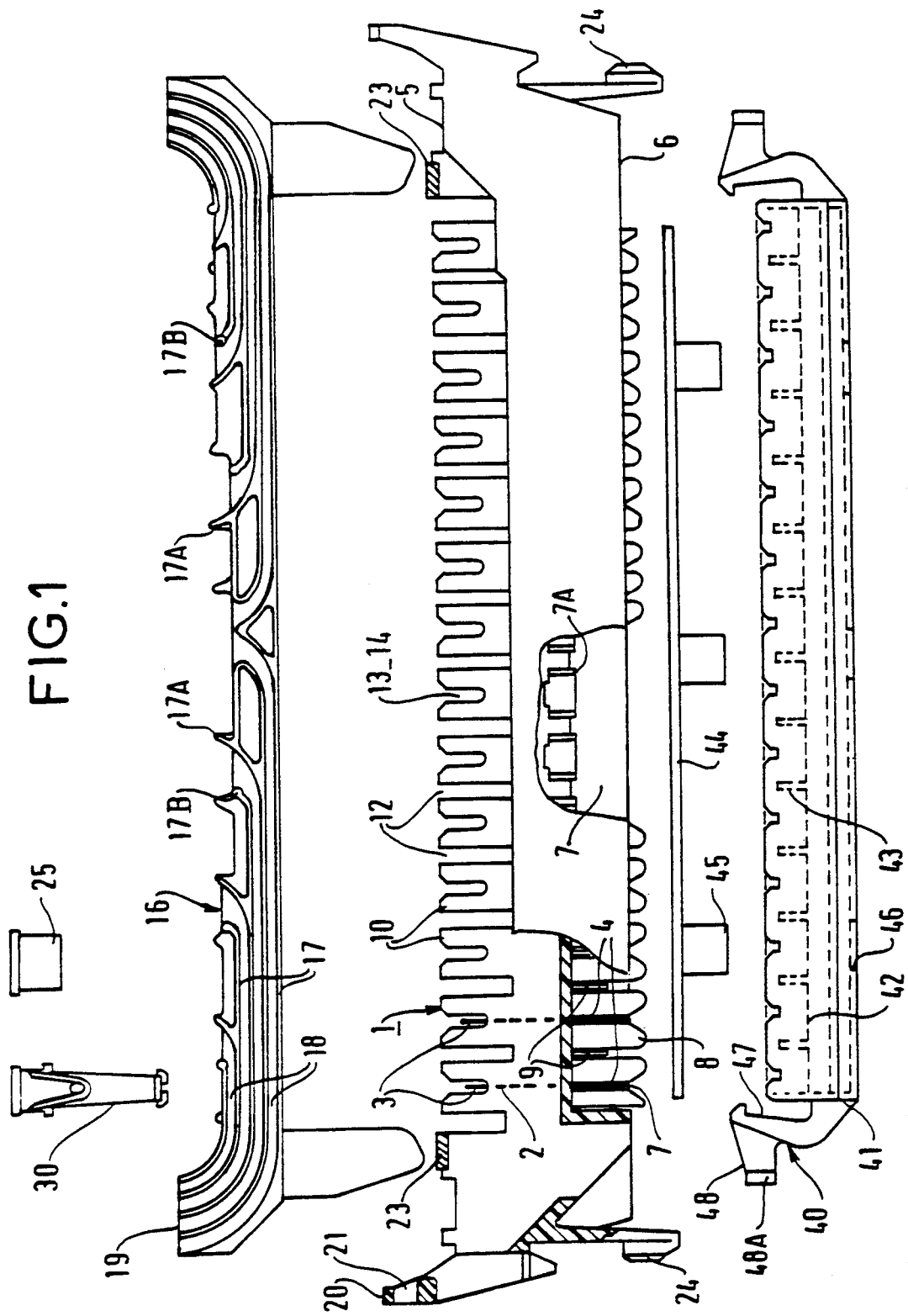
FIG. 1 is an exploded plan view showing a connection strip of the invention.
Figure 2:
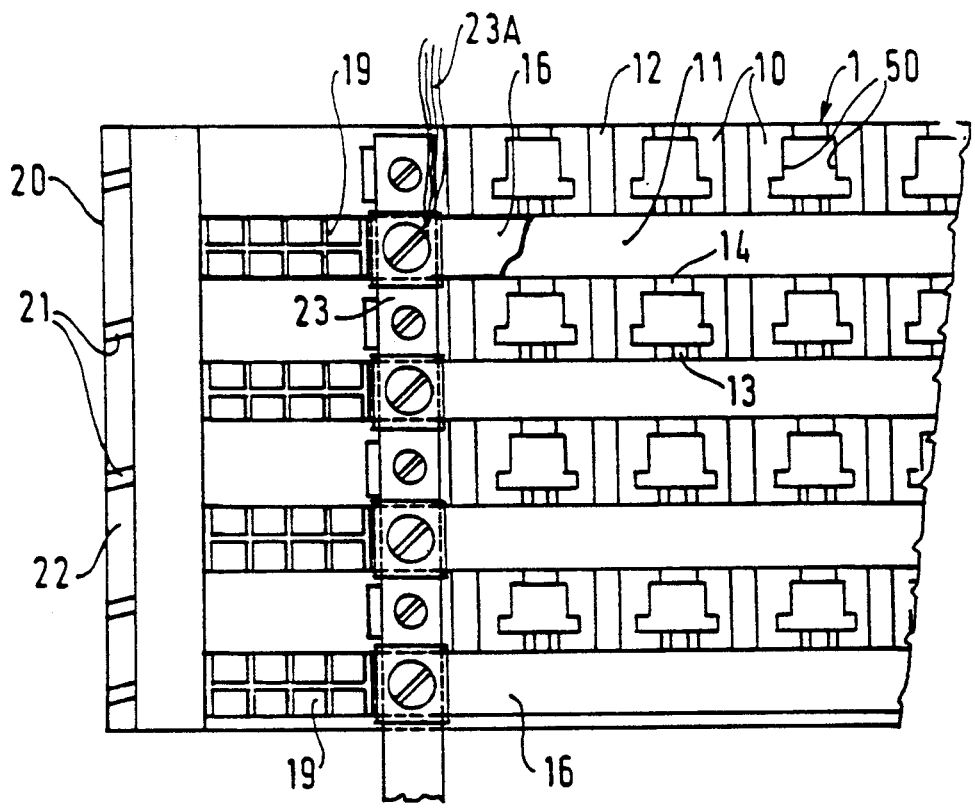
FIG. 2 is a fragmentary front view on a larger scale showing the insulating block or body of the FIG. 1 strip.
Figure 3:
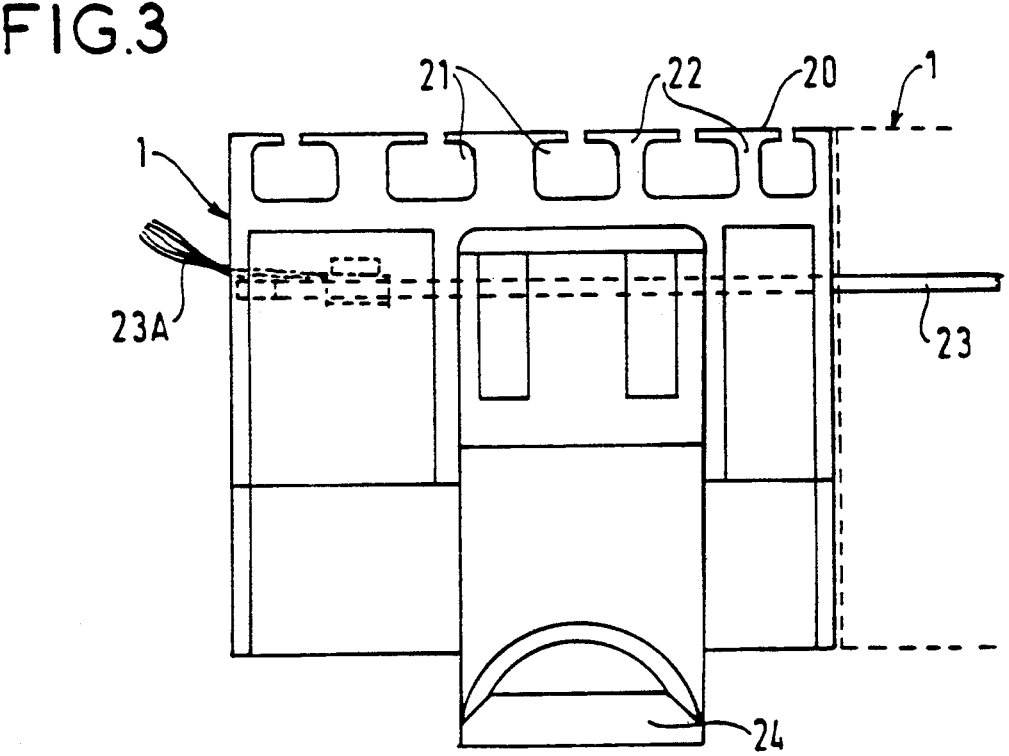
FIG. 3 is a side view of the FIG. 2 insulating block.

With reference to FIGS. 1 to 3, it can be seen that a connection strip of the invention comprises a block or body 1 of insulating material fitted with a plurality of individual connection elements 2. The terminal portions of the connection elements constitute connectors 3 and 4. They are accessible from respective faces of the block 1, referred to as the action or front face 5 and as the rear face 6, with "front" and "rear" being applicable to the connection strip under conditions of use, and they are disposed in a plurality of rows in these two faces.

In the example shown, each of the front and rear faces of the insulating block is fitted with four rows of 14 connectors each for use with a 28-pair cable.

The front connectors 3 are for use with jumper conductors and they are preferably insulation-displacement connectors. The rear connectors 4 are for use with the conductors of the various pairs of the cable (not shown). The connectors 4 may be connectors of the insulation-displacement type, or they may be of some other type. The connections between the various pairs of conductors and the connectors 4 are considered as being fixed and final, although it nevertheless remains possible to take action on the rear face to change previously established pairs. The connections on the front face are for changing according to requirements.

The connection elements 2 are securely retained in the block. The connectors 4 of the rear face 6 are surrounded by a continuous web 7, by a series of pairs of webs 8 extending along the longitudinal edges of each row and referred to as longitudinal webs, and by transverse webs 9 across each row.

The connection elements 2 are retained in the block 1 by the continuous webs 7. To this end, and as shown in the cut-away portion of the block 1 in FIG. 1, the edge of each continuous web 7 inside the block 1 has wedges 7A for retaining the connection elements or the row in question against the inside edges of the pairs of webs 8 formed on the block. Each continuous web 7 is initially independent from the block 1 and is ultrasonically welded to the block after the connection elements have been installed and retained in the block.

It may also be observed that once the top end continuous web 7 has been welded to the block it constitutes the fourth side wall of a reservoir defined over the entire periphery of the rear face 6 of the block. This reservoir may receive a sealant after the pairs of conductors have been connected to the connectors 4.

Figure 7:
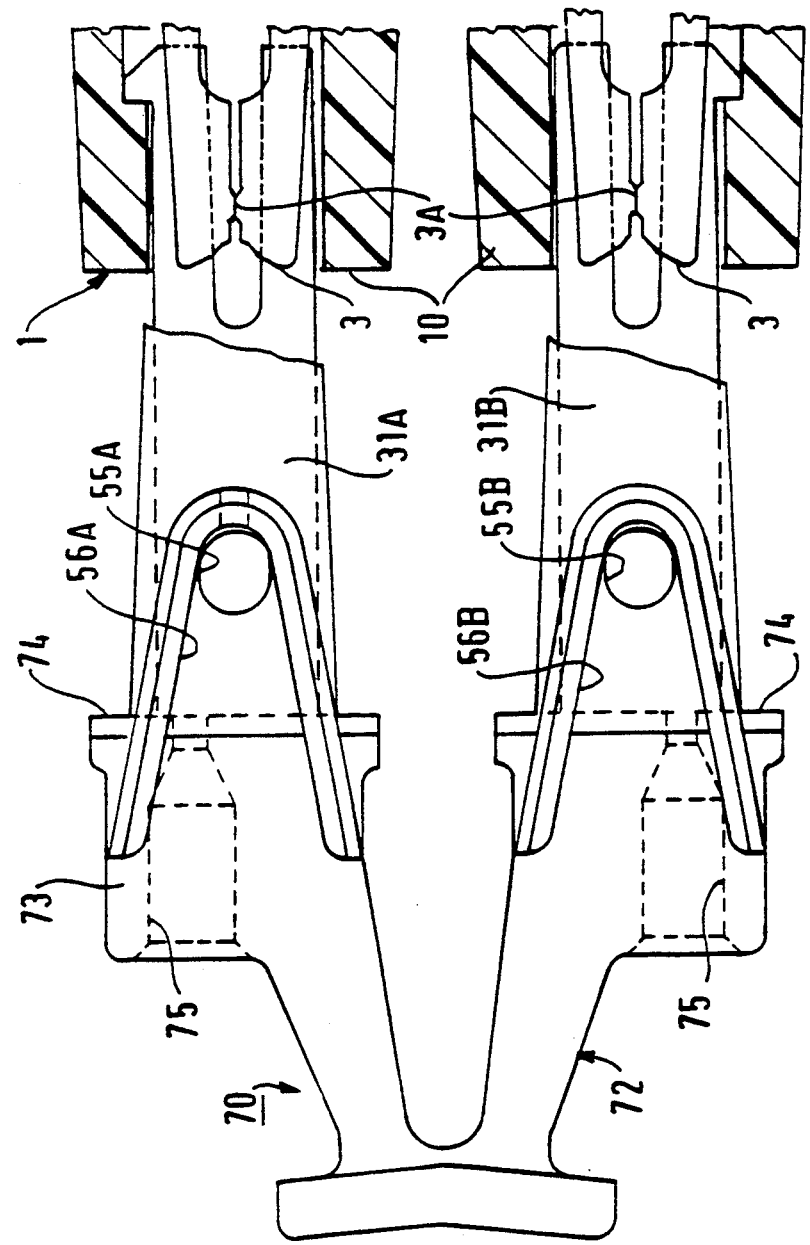
FIG. 7 is a given as a variant relative to the above-mentioned single pusher, showing a "twin" pusher in two chimneys of the insulating block.

In the block 1, the insulation displacement connectors 3 of the front face, such as those visible in FIG. 7, are disposed in individual chimneys 10. For example, their branches may have respective projections 3A for slicing through conductor insulation.

The chimneys are integral with the block and are defined in longitudinal ribs on its front face. Each rib corresponds to a row of chimneys 10 associated with a row of insulation displacement connectors 3. Each row of chimneys 10 is separated from the adjacent row by a longitudinal valley 11 used for passing the jumpers serving the row of chimneys above it, with a valley 11 also being provided beneath the bottom row of chimneys. In each row, each chimney 10 is separated from the adjacent chimneys by transverse slots 12.

Each of the chimneys 10 has two lateral slots 13 and 14 in its walls that extend in the length direction of the row. These two slots 13 and 14 face each other and the axis of the insulation displacement connector in the chimney. The slot 13 which constitutes the bottom slot when the connection strip is in use is narrower than the other slot 14 referred to as the "top" slot, and its width is slightly less than the diameter of the jumper conductors. The inside shape of each chimney 10 is described below.

These dispositions lead to a compact configuration for the insulation displacement connectors 3 in their individual chimneys, making it possible to obtain long creepage distances via the outline of each transverse slot 12 between adjacent installation displacement connectors. In addition, by means of each bottom slot 13, these dispositions serve to lock or securely retain the conductor connected to the insulation displacement connector 3 by clamping it in the slot at a point close to the connector and avoiding any possible damaging effects on the connection due to forces being applied to the conductor.

Each of the valleys 11 between the rows of chimneys receives a flat wire-guide part 16. The wire guides are identical to one another and they are matched to the respective rows of chimneys and insulation displacement connectors they serve. Each of them is inserted in one of the valley 11 and is snap-fastened in the block 1 or is retained by some other equivalent means.

Each wide guide 16 has ribs 17 on both of its faces, with channels 18 being defined therebetween for respective ones of the two conductors in the seven jumpers that may be associated with each row of insulation-displacement connectors. The channels on the two faces open out in alternate to the front edge of the wire guide, facing the bottom slots 13 of different chimneys. They also open out to the two ends of the front edge of the wire guide in partitioned sets 19 of independent outlet cells, organized in two lines for the two conductors of the jumpers.

On the front edge of each wire guide 16, alternate ribs 17 present extensions 17A that project slightly and small terminal cylindrical projections 17B on opposite sides of each channel 18 between two ribs. These dispositions at the ends of the ribs provide protection and appropriate guidance for the jumper wires while obtaining a wire guide that is compact.

Two wire-passing pieces 20 are held on the side ends of the insulating block 1. These two side wire-passing pieces 20 may be fixed to the block by ultrasonic welding. Their front edges project beyond the sets of outlet cells 19. The front edge of each wire-passing piece has through grooves 21 in the form of open rings that are separated from one another by T-shaped partitions 22. Advantageously, each wire-passing piece is provided with one more through groove 21 than there are sets of outlet cells 19. The partitions between the grooves 21 are substantially level with the various sets 19, with two consecutive grooves 21 being used for passing respective ones of the pairs of conductors in the jumpers.

The wire-passing pieces at each end of the block 1 thus spread out the jumper conductors from the sets of cells towards the corresponding pair of grooves 21 on either side of each set.

This makes it possible to separate the conductor in each jumper to identify them and to disengage them from the layer of jumpers in each groove, thereby making it easier to handle while it is being changed over or replaced.

In addition, in particular for application ot digital networks, the strip includes a grounding bar 23 fixed on the block 21 at each of the ends of the rows of chimneys. Such grounding bars are used for grounding the ground screens of the jumpers. It is merely specified that this screen is constituted by a wire such as one of the wires 23A connected to the bar 23, which wire is wound helically around the two conductors of a jumper together with a metal foil, e.g. an aluminum foil. Each grounding bar may be used for distributing ground to a plurality of connection strips.

The block 1 also has two end snap-fastening lugs 24 for fixing and holding it on a rear support (not shown).

The connection strip also includes caps, or preferably pushers, e.g. such as the one "single" cap 25 shown in FIG. 1 or the one "single" pusher 30 also shown in FIG. 1 and constituting the preferred variant. The caps or pushers are associated with the block 1, in particular for protecting the insulation displacement connectors 3 in the individual chimneys 10 of its front face. The connection strip also includes caps 40 in the form of bars which are associated with respective ones of the rows of connectors 4 in the rear face of the block 1. After jumpers have been connected to the connectors 3, the pushers such as 30 or the caps 25 serve to close the chimneys 10. The caps 40 cover the rows of connectors 4 after the conductor pairs in the cable have been connected to the connectors 4.

It is mentioned that each single cap 25 is filled with a special grease or gel and is shaped to produce a piston effect and close each chimney 10 in sealed manner. The caps 25 are discardable and they are replaced each time action is taken on them. When the connections are protected by such caps 25, the jumper conductors are installed in the insulation-displacement connectors by means of a standard tool for making connections of this type.

In a variant that is not shown, a "twin" cap may be used that is entirely analogous in operation to the cap 25 but which seals off two chimneys 10 simultaneously to protect the two conductors of a single jumper installed in the insulation displacement conductors of the two chimneys.

The cap 40 is comparable to the above-mentioned single or twin caps but it is designed to provide effective protection for all of the connectors 4 in one of the rows of the rear face. This cap 40 is in the form of a channel section hollow bar 41 having a longitudinal opening. It is fitted over the series of pairs of longitudinal webs 8 which it covers and it is guided against the continuous longitudinal web 7 which remains on the outside. It has an inside partition 42 that lines its wall partially and that is fitted over the series of pairs of webs 8, and it also has inside guide ribs 43 for inserting between the pairs of ribs 8. It includes a piston plate 44 inside the channel section bar and having tabs 45 that project outside the back of the channel section through slots 46 in the back. The cap 40 is filled special grease or gel while its piston plate is against the back of the channel section, it is installed on a row of connectors 4, and it is then actuated via the tabs 45 so as to obtain the piston effect for the plate 44, thereby distributing the gel and completely filling and sealing off the row of connectors 4.

The transverse webs 9 between the connectors 4 in each row of the rear face 6 constitute end-of-stroke abutments for the piston plate 44.

Two end snap-fastening lugs hold the cap 4 securely on the insulating block 1. A hook 48 projecting from each lug makes it possible to remove the cap, if necessary.

A terminal projection 48A extending transversely to each hook 48 serves as a lever for extracting the cap 40 by means of a special tool. Advantageously, the special tool is the tool used for disconnecting conductors from the rear face, and possibly also from the front face of the connection strip.

The single pusher 30 is described in detail with reference to FIGS. 4 to 6, and it is assumed to be the same way up as when the connection strip is in use. The chimneys 10 are also described with reference to FIG. 4.

The single pusher 30 serves firstly to insert a jumper conductor into the desired insulation displacement connector 3 in a chimney 10, or to extract a conductor that has already been installed, and secondly to protect the insulation displacement connector 3 by closing off the chimney, whether or not there is a jumper conductor in the connector.

The pusher has a single leg 31 matching the inside shape of each chimney for proper guidance, and it has a head 32 at its front end for actuating the pusher and closing off the chimney.

The leg 31 has a substantially middle slot 33 parallel to its bottom and top faces, thus splitting the leg over its entire length into a top portion 34 and a bottom portion 35. These two portions are inserted on either side of the insulation displacement connector 3 in the chimney. One of these portions, in this case the slightly thicker top portion 34, has an inside chamfer 36 at its end to facilitate inserting the leg over the insulation displacement connector 3.

The top portion 34 also has a substantially central slot 37, but only in its end portion. On either side of this slot 37 there are two resilient lugs with respective snap-fastening catches 38, thus providing "snap-fastening lugs" designated by the same reference as their catches.

Figure 4:
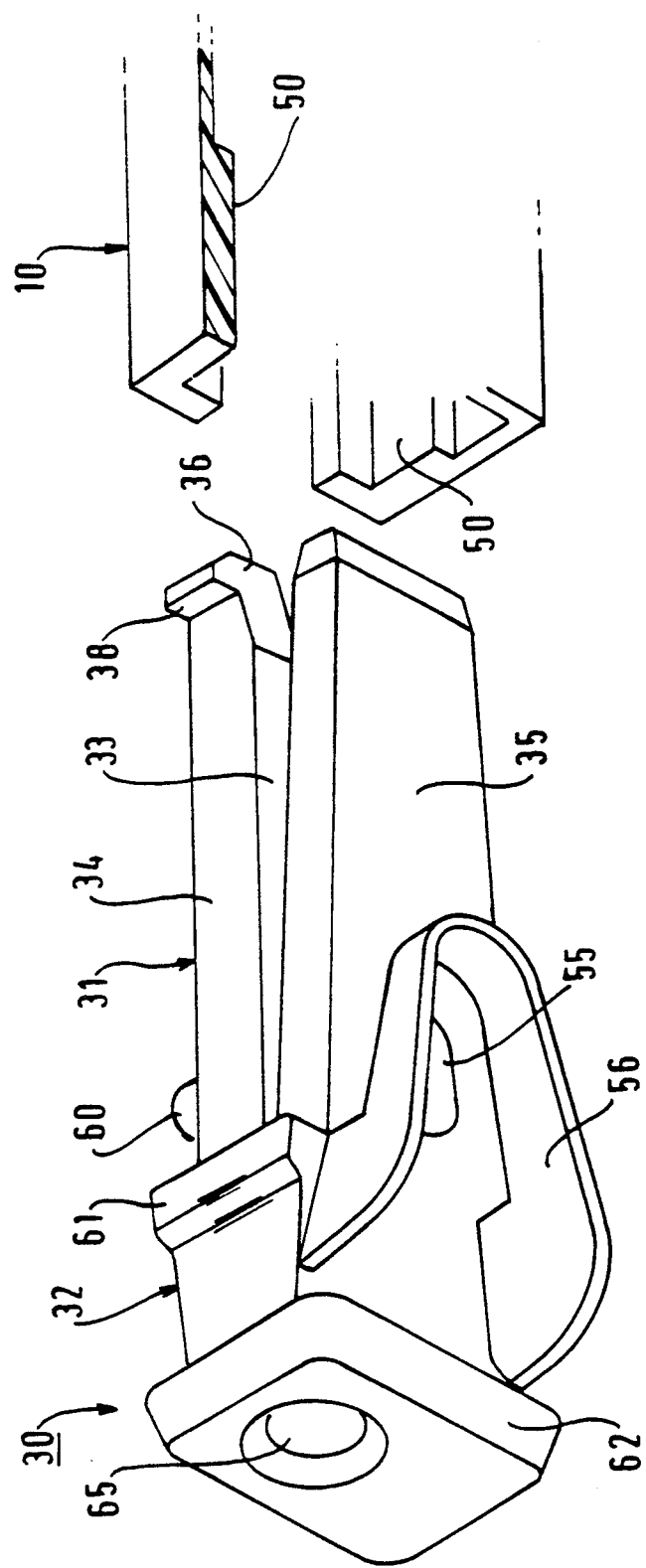
FIG. 4 is a perspective view of a "single" pusher in front of one of the chimneys in the insulating block of the FIG. 1 strip.

Inside the chimney 10, these two snap-fastening lugs 38 correspond to two facing inside shoulders 50 extending over substantially the top halves only of the vertical walls extending across the row of chimneys, and occupying only the front end portions of these walls (FIGS. 2 and 4). These shoulders 50 ensure that the single pusher is held captive or is locked in its chimney while being free to move between a pulled-out position and a pushed-in position. They prevent easy extraction of the pusher from its chimney, thus protecting it against all kinds of potential damage that may be mechanical, electrical, or environmental such as dust, insects, and moisture, for example.

The front portion of the leg 31 close to the head has a through hole 55 passing through both portions 34 and 35 thereof for the purpose of receiving a jumper conductor. The conductor is inserted in the hole 55 via the bottom face of the pusher when the hole is made accessible by the pusher being moved to its forward, pulled-out position while still being locked in the chimney.

To facilitate inserting the conductor brought beneath the chimney by the wire guide associated with the row of chimneys and mounted beneath said row as described above with reference to FIGS. 1 and 3, the bottom portion 35 of the leg 31 has an outside guide V 56 for blind insertion of the conductor into the hole 55.

This outside guide V 56 constitutes an integral portion of the pusher. Its opening faces towards the front head 32. The ends of its two branches are integral with the head 32, but the branches themselves project from the outside face of the bottom portion 35 of the leg and are spaced apart from the portion 35 by a slot 57. The slot 57 enables the V 56 to be inserted on the bottom wall of the chimney when the pusher is in its pushed-in position. The tip of the V 56 passes round the hole 57 which opens out into the tip, and the inside periphery of the V is rounded to match the rear periphery of the hole 55. In addition, the V has a bridge 58 linking it to the rear edge of the hole and co-operating with the V to constitute a continuous rear abutment for guiding the wire on insertion into the hole.

Figures 5, 6:
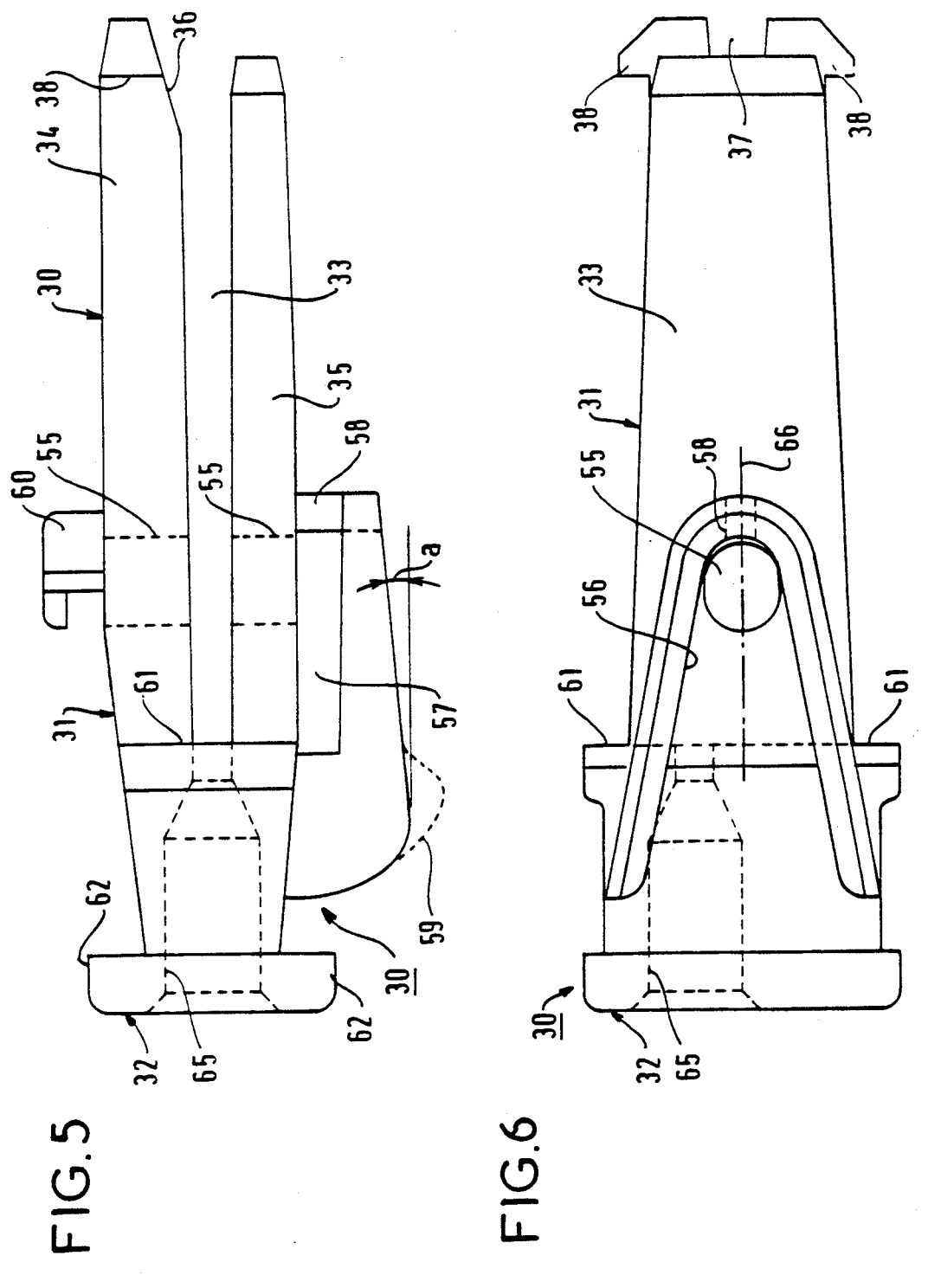

Advantageously, and as can be seen in FIG. 5, the bottom edge of each of the branches of the guide V 56 slopes downwards from back to front leaving a cut-out angle a at front ends of the branches. The branches may also have a small end projection 59 shown in dashed lines and serving for protective purposes.

These cut-out angles or the like channel moisture and prevent it propagating towards the tip of the V and forming capillary bridges.

In addition, the single pusher 30 has a loop-hole 60 on the top face of its leg 31. This loop-hole is obtained from a circular stud left on the top portion 38 of the leg at the end of the hole 55 and itself having an open front edge. For the purpose of directly checking that the conductor is present, it makes it possible, when the pusher is in its pulled-out position, to observe the end of the wire inserted in the pusher.

The head 32 defines two lateral shoulders 61 between the head and the leg and for coming into abutment against the end of the chimney. The head also has two end shoulders 62 at its top front edge and at its bottom front edge for the purpose of grasping the pusher to pull it out, and also for facilitating forcible extraction thereof, e.g. by leverage with a screwdriver.

When the pusher is pushed into the chimney, the lateral shoulders 61 on the head come into abutment with the end of the chimney and the semicircular rear edge of the loop-hole likewise comes into abutment with the tip of the top slot 14 in the top wall of the chimney. The tip of the slot 14 is rounded.

When the pusher is pushed in, the conductor passes through the inlet V between the branches of the insulation displacement connector, and its insulation is sliced such that after passing the insulation slicing projection 3A less thrust is required, and optionally the pusher may move perceptibly past a projection provided on the edges of the slot 14 for the loophole, for example, such that on reaching the end of its pushed-in stroke the pusher gives a tactile sensation that connection has been made, together with a click sound.

The single pusher 30 also includes a test point hole 65. This test point hole opens out in the front of the head and between the two portions of the leg 31. It is advantageously slightly offset from the central axis 66 of the head so as to be similarly offset from the axis of the installation displacement connector. This offset guarantees that a test contact is suitably made on one or other of these two branches of the installation displacement connector 3 without penetrating into the V-shaped inlet thereof where there may remain fouling due to slicing through the installation of the installed conductor.

The test point hole 65 may also be used for mounting an identifying peg or cover (not shown) on the front face of the single pusher, in particular for identifying special lines on demand.

It may also be observed that single pushers are advantageously made in two different colors. They are mounted in alternation on the front face of the connection strip or in alternating pairs to facilitate locating different jumpers or locating the conductors of each of the jumpers.

FIG. 7 shows a variant pusher, called a "twin" pusher 70. The twin pusher is essentially comparable to the single pusher 30 except that it installs two jumper conductors simultaneously in two installation displacement conductors 3 in two adjacent chimneys 10. A detailed description of such a twin pusher is therefore not given below. Only its differences and special features compared with a single pusher are described.

The twin pusher 70 has two legs 31A and 31B which are substantially identical to the above-described single leg 31, and it has a front end head 72 interconnecting the two legs. The references used above for the single pusher are used to designate the same items on the two legs 31A and 31B.

The head 72 of the twin pusher constitutes a joining bridge in the form of an arch. The two ends 73 of the arch define two lateral shoulders 74 between themselves and the legs 31A and 32B, providing abutments for the twin pusher when in its pushed-in position in its two chimneys. Two test points 75 provide access to the two insulation displacement connectors concerned. Each of them is offset relative to the axis 66 of its installation displacement connector, and they are provided in said ends 73.

The arch shape given to the head 72 makes it possible to obtain creepage distances via the head that are long when the twin pusher is in its pushed-in position in its chimneys, and also makes it possible to extract the twin pusher with a screwdriver.

In a variant (not shown) described relative to the single cap 25 shown in FIG. 1 and to the twin pusher shown in FIG. 7, it is also possible to use a twin cap for simultaneously closing both of the adjacent chimneys containing the two insulation displacement connectors for the conductors of each jumper. Under such conditions, the conductors of each jumper are installed in their insulation displacement connectors by means of a tool that is standard for this type of connection. A twin cap has a head analogous to that of the twin pusher, and is thus in the form of an arc whose ends are connected to two cap bodies that are mounted on two respective chimneys.

In a variant that is not shown but is easily derived from the embodiment described above and shown in the drawings, the connection strip has a rear face that is analogous to or substantially analogous to its front face, with its rear connectors 4 likewise being in individual "rear" chimneys. Under these conditions, the rear chimneys have one of their walls defined the above-mentioned web 7 which is then appropriately notched to define slots between the chimneys and in the appropriate walls of each of them.

We claim:

1. A connection strip for high reliability interconnection of pairs of conductors in a cable and pairs of conductors in jumpers, the strip comprising:
    an insulating block having projecting rows of chimneys on a "front" one of its faces, with valleys between the rows of chimneys for passing the conductors of the jumpers;
    a plurality of connection elements mounted and held in said block, terminal portions of the connection elements defining first individual connectors in respective chimneys on said front face of the block for connection with jumper conductors, and rows of second individual connectors on the opposite "rear" face of the block for connection with the cable conductors;
    first protection means for protecting the conductors of each jumper installed in the first connectors in their chimneys; and
    second protection means for protecting the cable conductors installed in each row of second connectors;
    wherein said chimneys are separated from one another by transverse first slots extending across the rows thereof, thereby creating creepage distances around the outlines of said transverse slots, and
    wherein the connection strip further includes two wirepassing pieces at the ends of said block at the ends of the rows of chimneys and having grooves for passing the jumper conductors into said valleys.

2. A connection strip according to claim 1, wherein each wirepassing piece has one more groove than there are valleys in the block, and has consecutive ones of its grooves taken in pairs disposed substantially end-on on either side of one of the valleys for the purpose of conveying respective ones of the conductors in each of the jumpers in the valley, thereby splaying out and separating the conductors of the various jumpers.

3. A connection strip according to claim 1, and including wire guides mounted in the valleys between the rows of chimneys, having ribs on their two faces defining therebetween guide channels for the jumper conductors along each of the rows of chimneys, the connection strip being wherein it further includes an additional "bottom" valley for the bottom row of chimneys, said valley being analogous to the valleys between the rows of chimneys and receiving a "additional" wire guide, and wherein a "front" edge of each wire guide when mounted in its valley has projecting extensions and cylindrical end projections formed in alternation at the ends of successive ribs on each of its two faces for the purpose of appropriately protecting and guiding conductors over the compact wire guide.

4. A connection strip according to claim 1, and in which each chimney includes "bottom" and "top" second slots in its walls parallel to the valleys for passing the jumper conductors, wherein the bottom slot is of width perceptibly smaller than the diameter of the insulated jumper conductor received in the chimney therethrough, thereby retaining the conductor between its edges at a point close to the first connector in said chimney.

5. A connection strip according to claim 1, wherein said first protection means are "single" caps filled with special grease or gel and mounted on each chimney.

6. A connection strip according to claim 1, wherein said first protection means are "twin" caps having two individual caps per se filled with grease or gel for two adjacent chimneys and having a head in the form of an arc interconnecting the two individual caps.

7. A connection strip according to claim 1, further including a grounding bar mounted on the block at at least one of the ends of the rows of chimneys, with a wire belonging to the ground screen of each jumper being connected thereto.

8. A connection strip according to claim 1, wherein the rear face of the block is arranged substantially identically to its front face and includes individual "rear" chimneys for said second connector, and wherein said protection means for protecting the cable conductors are single or twin caps or single or twin pushers which also serve to install the cable conductors in the second connectors.

9. A connection strip according to claim 1, wherein said first protection means are constituted by pushers each including a head, at least one leg connected to the head and adapted to fit in a chimney for guidance purposes and for installing one of the jumper conductors inserted therethrough on the first connector in the chimney, which connector is of the insulation displacement type, lateral abutments between the head and each leg for stopping the pusher in a "pushed-in" position, and end snap-fastening means projecting from the end of each leg, and wherein the "front" ends portions of the chimneys include inside shoulders for said snap-fastening means enabling the pushers to be mounted on the block and to be held captive thereon in a "pulled-out" position.

10. A connection strip according to claim 9, wherein said pusher head includes "top" and "bottom" end shoulders for enabling the pusher to be grasped for actuation purposes, in particular when the pusher is to be pulled from its pushed-in position to its pulled-out position, and also for forcibly extracting the pusher.

11. A connection strip according to claim 9, further including covers associated with the individual pushers and applied ot the ends of their heads for conductor identification purposes.

12. A connection strip according to claim 9, wherein each pusher leg is split longitudinally, being divided into a "top" portion and a "bottom" portion, has said snap-fastening means on one of said top and bottom portions which is likewise split at the end, and includes an external guide V on said bottom portion for blind insertion of the conductor in an insertion hole passing through the leg. said guide V having non-touching branches overlying said bottom portion and having a tip into which the insertion hole opens out, said tip fitting around a portion of the outline of said hole and being connected thereto by a bridge.

13. A connection strip according to claim 12, wherein the edges of the guide V facing away from said bottom portion present an undercut angle and are optionally fitted with additional end means at the ends of the branches of the V for channeling moisture.

14. A connection strip according to claim 12, wherein the top portion of the pusher leg includes an outwardly projecting loop-hole extending the conductor insertion hole and constituted by a cylindrical stud that is partially removed at the front adjacent to the head of the pusher.

15. A connection strip according to claim 14, wherein the rear edges of said observation loophole-forming stud facing away from the pusher head constitute an abutment for engaging the tip of the top slot in each chimney when the pusher in its pushed-in position.

16. A connection strip according to claim 15, having projections on each chimney and/or on each first connector for obtaining a tactile sensation when a connection is made substantially at the end of the stroke of the pusher in its pushed-in position.

17. A connection strip according to claim 12, wherein said pushers have single legs and are used individually in each of said chimneys and are referred to as "single" pushers.

18. A connection strip according to claim 17, wherein each of said single pushers further includes a test point hole passing through said head and opening out between the top and bottom portions of said single leg, the test point hole being offset from the axis of the head and relative to the axis of the insulation displacing connector in each chimney.

19. A connection strip according to claim 17, wherein said single pushers are made in two different colors and are associated in identical or different color pairs with the conductors of each jumper.

20. A connection strip according to claim 12, wherein said pushers have two legs and a head in the form of an arch interconnecting the two legs, each pusher being used in association with two consecutive chimneys and being referred to as a "twin" pusher, serving to install both conductors of a jumper on the individual insulation displacement connectors of said two chimneys.

21. A connection strip according to claim 20, wherein each of said twin pushers has two test point holes passing through the ends of the arch defined by the head and opening out between the top and bottom portions of respective ones of each of the two legs, each hole being offset from the axis of its leg and from the axis of the corresponding insulation displacement connector.

22. A connection strip according to claim 1, wherein said second projection means for protecting the cable conductors installed on each row of second connectors are constituted by caps in the form of a bar for each row and second connectors, the caps being filled with grease or gel and having respective internal piston plates that can be actuated from outside the bar-shaped cap.

23. A connection strip according to claim 22, wherein each bar-shaped cap has end lugs for snap-fastening to the block and outwardly projecting extraction hooks with transverse end projections constituting respective extraction levers on each of the hooks.

* * * * *